United States Patent [19]
Richards et al.
[11] Patent Number: 4,707,322
[45] Date of Patent: Nov. 17, 1987

[54] BERYLLIUM-7 LABELED CARBON PARTICLES AND METHOD OF MAKING

[75] Inventors: Powell Richards, New Bern, N.C.; Leonard F. Mausner, Stony Brook; Thomas F. Prach, Port Jefferson, both of N.Y.

[73] Assignee: The United States of America as represented by the United States Department of Energy, Washington, D.C.

[21] Appl. No.: 728,359

[22] Filed: Apr. 29, 1985

[51] Int. Cl.[4] .......................... G21G 1/10; G21G 4/00; C09K 11/00; C09K 11/04

[52] U.S. Cl. .................................... 376/194; 252/644; 252/645; 376/195; 424/1.1; 424/9

[58] Field of Search ........................ 252/625, 645, 644; 424/1.1, 9; 376/195, 194, 190; 423/111, 249

[56] References Cited

U.S. PATENT DOCUMENTS

| | | | |
|---|---|---|---|
| 3,334,050 | 8/1967 | Grotenhuis et al. | 252/644 |
| 4,011,076 | 3/1977 | Hovis, Jr. et al. | 419/38 |
| 4,141,726 | 2/1979 | Yajima et al. | 75/229 |

OTHER PUBLICATIONS

Bewley et al., Phys. Med. Biol., 29, No. 4, 341–349, 1984.

Phys. Med. Biol., 23, No. 2, 217–234, 1978.

*Primary Examiner*—Stephen J. Lechert, Jr.
*Assistant Examiner*—Howard J. Locker
*Attorney, Agent, or Firm*—Margaret C. Bogosian; James W. Weinberger; Judson R. Hightower

[57] ABSTRACT

Beryllium-7 labeled carbon particles made from the proton irradiation of carbon materials, preferably from dry carbon black are disclosed. Such particles are useful as gamma emitting radiotracers.

6 Claims, No Drawings

BERYLLIUM-7 LABELED CARBON PARTICLES AND METHOD OF MAKING

The U.S. Government has rights in this invention pursuant to Contract Number DE-AC02-76CH00016, between the U.S. Department of Energy and Associated Universities Inc.

BACKGROUND AND GENERAL DESCRIPTION

The present invention deals with the development of a beryllium-7 radiotracer produced within the lattice of carbon black. Beryllium-7 has a 53-day half life and a 478 KeV gamma ray. The beryllium-7 solid carbon particles are produced by proton irradiation of pure carbon black. The activity concentration of beryllium-7 in carbon may be controlled by a variation in the duration of bombardment. Typically, there is produced 11 μCi/mg of carbon in two weeks bombardment at 50 μA, but levels up to about 100 μCi/mg could be achieved at saturation. The activity concentration of the non-ionic surfactant suspension is typically 300–400 μCi/ml.

The gamma radiation of the beryllium-7 labeled carbon particles is sufficiently energetic that whole body counting allows the determination of the kinetics of clearance and the biodistribution of residual particulate material. A number of other useful applications can be made of this material. The product can be used in intestinal absorption of non-digestible particulate matter in animal models. The beryllium-7 labeled carbon has also been utilized to characterize the distribution of material intratracheally introduced in rodents. In a further application, the beryllium-7 labeled carbon can also be aerosolized and serve as a model for particulate matter associated with air pollution.

SPECIFIC DISCLOSURE

The use of high energy protons to create beryllium-7 as a radiotracer of pure carbon materials is a novel discovery which is based upon the observation that beryllium-7 is created directly in the crystal lattice of carbon by virtue of the nuclear reaction $^{12}C(p,3p3n)^{7}Be$. The resulting beryllium-7 is then trapped firmly in the crystal lattice of the solid which results in a more stable radiotracer than the typical chemically attached radiolabel. For example, neutron activated coal or similar carbon containing substances will contain usable radionuclides produced not by the solid coal but rather by impurities in the coal. Obviously a radionuclide of variable composition based solely upon impurity content is not satisfactory to fulfill the requirements of a uniform high quality radiotracer. Therefore, neutron activation is not practical to create radiotracers from pure carbon.

It is this drawback of neutron activation of coal which has been unexpectedly overcome in simple fashion by the method of the present invention. The product qualities of substantially pure carbon containing the unique radiotracer beryllium-7, namely the convenient half life of 53 days compared with the extremely short life of $^{11}C$ and the unique gamma ray emitting property not possessed by $^{14}C$, makes the final product suitable in a unique manner for in vivo animal monitoring of intestinal absorption.

The unique radiotracer, beryllium-7 labeled carbon particles, is produced by proton nuclear reactions on dry carbon black at energies in excess of 50 MeV. Beryllium-7, with a 53-day half life and a 478 KeV gamma ray (10% abundant), is created directly in the carbon lattice structure, making the radiolabel quite stable against chemical attack. Carbon is attractive for particle uptake and distribution studies because it is insoluble, non-toxic and is available in high purity with varying particle sizes. Further, the carbon isotopes one might consider as a radiolabel are not suitable for this application. Carbon-11 [created by (p,pn) reactions] has an inconveniently short half-life, while $^{14}C$ (created by neutron absorption) is very long lived and has no gamma rays, which are required for in vivo detection. Further, beryllium-10, which is a terrestrial nuclide produced from nitrogen and oxygen in the atmosphere, is unsuitable as a radiotracer due to its extremely long decay time.

The beryllium-7 labeled carbon particles are prepared by irradiating pure carbon black contained in stainless steel disk capsules at the Brookhaven Linac Isotope Producer (BLIP), located at Brookhaven National Laboratory. After irradiation, targets are cut open and the carbon is removed and washed with, for example hydrochloric acid or ethanol, and then water to remove loosely bound surface radioactivity. Finally, the cleaned carbon is suspended in a solution of a non-ionic surface active agent by vigorous stirring. Other forms of carbon can be activated, such as fibers, coarse carbon particles, graphite cloth, or carbon particles comprising a mixture of fine and coarse.

EXAMPLE 1

The target material was pure carbon black, with a particle diameter of approximately 27 nanometers. Three grams of powder were poured into an aluminum foil package and sealed into a stainless steel disk capsule. Irradiations were carried out at the Brookhaven Linac Isotope Producer (BLIP) with incident energies of 191 MeV and 68 MeV for periods varying between 4 and 16 days. After bombardment, the targets were cut open and the carbon poured into a solution of pH 1.4 HCl and then centrifuged and filtered to separate the carbon. The carbon was "washed" twice more with water in this manner, and the combined supernatant was assayed. These washings served to remove beryllium-7 only loosely bound on grain surfaces and to remove Na-22 found on the target surface (produced from recoil out of the aluminum wrapping). The remaining beryllium-7 was very firmly held in the carbon since extensive dialysis removed only negligible further quantities of activity. The fraction of Na-22 activity remaining was about $2\times10^{-4}$. Finally, the carbon was dispersed in a solution of Tween 80 by vigorous stirring. Microscopic examination of the samples was used to find suspension conditions with minimum clumping. Once suspended, there was no settling even after days of standing. The pH of this mixture was 5.2.

In the above example Tween 80 is a registered trademark (ICI Americas, Inc.) for the polyoxyethylene derivative of the partial ester of a fatty acid with sorbitol anhydride, the number 80 refering to the degree of esterification. In the preparation of these non-ionic emulsifiers, the manufacturer informs the user that the dispersibility in water and in various organic solvents is controlled between the lower value numbers and the higher value numbers. Any non-ionic general purpose surface active agent including polyethoxy and polypropyloxy may also be used.

Although the above illustrative example discloses the production of approximately 10% of maximum lattice bound beryllium-7, it is obviously possible to control the radioactivity concentration from minimum levels to 100% by simply shortening or lengthening the proton nuclear radiation exposure.

We claim:

1. Beryllium-7 labeled solid carbon particles produced by proton nuclear reaction at energies in excess of 50 MeV wherein the beryllium-7 formed by said proton nuclear reaction is trapped in the lattice structure of the carbon.

2. The beryllium-7 labeled carbon particles of claim 1 wherein the carbon is in the form of finely divided carbon black.

3. The beryllium-7 labeled carbon particles of claim 1 wherein the carbon is in the form of carbon fibers.

4. The beryllium-7 labeled carbon particles of claim 1 wherein the carbon is in the form of graphite cloth.

5. The beryllium-7 labeled carbon particles of claim 1 wherein the carbon is in the form of coarse carbon particles.

6. The beryllium-7 labeled carbon particles of claim 1 in which the beryllium-7 is characterized by a half life of 53 days and a 487 KeV gamma ray (which accompanies nuclear decay 10% of the time) with concentration in said lattice structure varying between minimal levels to 100 $\mu$Ci/mg of carbon.

* * * * *